US011122392B2

(12) United States Patent
Lloyd et al.

(10) Patent No.: US 11,122,392 B2
(45) Date of Patent: *Sep. 14, 2021

(54) PROVISIONING WIRELESS DEVICE PROFILES

(71) Applicant: MARS, INCORPORATED, McLean, VA (US)

(72) Inventors: Kevin Lloyd, San Francisco, CA (US); Chris Aiuto, San Francisco, CA (US); Steven Eidelman, San Francisco, CA (US); Ben Jacobs, San Francisco, CA (US)

(73) Assignee: Mars, Incorporated, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/357,092

(22) Filed: Mar. 18, 2019

(65) Prior Publication Data
US 2019/0215682 A1    Jul. 11, 2019

Related U.S. Application Data

(63) Continuation of application No. 13/843,645, filed on Mar. 15, 2013, now Pat. No. 10,271,200.

(51) Int. Cl.
*H04W 4/029* (2018.01)
*H04W 12/30* (2021.01)
(Continued)

(52) U.S. Cl.
CPC ......... *H04W 4/029* (2018.02); *H04L 41/0806* (2013.01); *H04W 8/20* (2013.01);
(Continued)

(58) Field of Classification Search
CPC ....... H04W 4/00; H04W 4/026; H04W 4/027; H04W 4/04; H04W 4/043; H04W 4/30;
(Continued)

(56) References Cited

U.S. PATENT DOCUMENTS 7,602,302 B2    10/2009  Hokuf et al.
7,832,355 B2    11/2010  Mills
(Continued)

FOREIGN PATENT DOCUMENTS

WO    2014144126 A2    9/2014
WO    2014144126 A4    9/2014

OTHER PUBLICATIONS

Current Claims in application No. PCT/US2014/028409, dated Sep. 2014, 8 pgs.
(Continued)

*Primary Examiner* — San Htun
(74) *Attorney, Agent, or Firm* — Mars, Incorporated; Rebecca M. Barnett

(57) ABSTRACT

Approaches, techniques, and mechanisms are disclosed for provisioning wireless device profiles of a wireless computing device. In this context, a wireless device profile generally may comprise one or more network and device settings including network identifiers, network security types, network keys, and other configuration information that enables a computing device to connect to a particular wireless computer network. According one embodiment, a computer-implemented method comprises establishing, with a first device, a first wireless connection of a first wireless connection type; receiving, from the first device via the first wireless connection, provisioning data for establishing, with a second device, a second wireless connection of a second wireless connection type that is different than the first wireless connection type; establishing, based on the provisioning data, the second wireless connection with the second device.

20 Claims, 4 Drawing Sheets

(51) Int. Cl.

| | |
|---|---|
| *H04W 76/10* | (2018.01) |
| *H04L 12/24* | (2006.01) |
| *H04W 8/20* | (2009.01) |
| *H04W 76/16* | (2018.01) |
| *H04W 88/04* | (2009.01) |
| *H04W 88/06* | (2009.01) |

(52) U.S. Cl.
CPC ........... *H04W 12/30* (2021.01); *H04W 76/10* (2018.02); *H04W 76/16* (2018.02); *H04W 88/04* (2013.01); *H04W 88/06* (2013.01)

(58) Field of Classification Search
CPC ........... H04W 4/38; H04W 4/50; H04W 4/80; H04W 84/18; H04W 84/20
See application file for complete search history.

(56) References Cited

U.S. PATENT DOCUMENTS

| | | | |
|---|---|---|---|
| 8,165,141 | B2 | 4/2012 | Balgaard et al. |
| 8,494,502 | B2 | 7/2013 | Abel et al. |
| 8,606,265 | B2 | 12/2013 | Ekici et al. |
| 8,625,552 | B2 | 1/2014 | Roberts et al. |
| 8,813,198 | B2 | 8/2014 | Louboutin et al. |
| 9,288,228 | B2 | 3/2016 | Suumäki |
| 2005/0110778 | A1 | 5/2005 | Ben et al. |
| 2008/0139118 | A1* | 6/2008 | Sanguinetti ............ H04B 1/406 455/41.2 |
| 2010/0093278 | A1* | 4/2010 | Abel .................... H04B 5/0031 455/41.1 |
| 2011/0289229 | A1 | 11/2011 | Subramaniam |
| 2011/0300802 | A1* | 12/2011 | Proctor, Jr. ............. G06F 21/60 455/41.2 |
| 2013/0005353 | A1* | 1/2013 | Traynor .................. H04W 8/22 455/456.1 |
| 2013/0014232 | A1* | 1/2013 | Louboutin ........ H04M 1/72527 726/5 |
| 2013/0186962 | A1* | 7/2013 | Kennett ................ G06K 1/128 235/494 |
| 2013/0196651 | A1* | 8/2013 | Ekici ................. H04W 52/0206 455/426.1 |

OTHER PUBLICATIONS

"International Searching Authority", Search Report, in application No. PCT/US2014/028409, dated Sep. 15, 2014, 17 pgs.

Zhang, "Wi-Fi Direct Based Smart Set-Up (WDSS) In Lighting Systems", M.Sc Thesis, Delft University of Technology, dated May 15, 2012, 76 pgs.

\* cited by examiner

PROVISIONING WIRELESS DEVICE PROFILES

CROSS-REFERENCE TO RELATED APPLICATIONS

The present application is continuation application of U.S. patent application Ser. No. 13/843,645, filed Mar. 15, 2013, entitled "Provisioning Wireless Device Profiles", which is hereby incorporated herein by reference in its entirety.

TECHNICAL FIELD

The present disclosure generally relates to provisioning a wireless computing device for connectivity with a wireless network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Today computing devices commonly are equipped for communication over one or more types of computer networks, including wireless networks. Before a computing device is able to connect to a particular wireless computer network, the device typically may undergo some form of device provisioning. In this context, provisioning a device for wireless network connectivity generally may refer to any processes related to configuring the device for connectivity with one or more particular wireless device networks. For example, a smartphone may be provisioned with certain network settings that enable the smartphone to connect and communicate with a particular cellular network, and a wireless sensor device may be provisioned with network settings that enable the wireless sensor to connect and communicate with other wireless sensors. With the Bluetooth protocol, some aspects of provisioning may be performed automatically using a wireless messaging dialog known as pairing. With Wi-Fi, provisioning may involve identifying an access point by name and providing security credentials.

Some provisioning of wireless devices for wireless network connectivity may be carried out by a manufacturer or service provider associated with the devices. For example, a cellular network service provider may be able to provision a smartphone for operation on the service provider's network before the device is provided to an end user. However, for some device use cases, appropriate network settings may be unknown to a manufacturer or service provider associated with a wireless device and provisioning the wireless device before it is provided to an end user may not be feasible for those uses. For example, a particular wireless device may be intended for connectivity with a user's personal wireless network at the user's home. Appropriate settings for connecting to the user's personal home network may have been configured by the user and, in these instances, the user may be responsible for provisioning the device to connect to the user's personal network.

In order to enable an end user to provision certain devices for wireless connectivity, some devices may provide a display, graphical user interfaces, and input controls that enable a user to specify the relevant network configuration information at the device. However, not all networkable computing devices may be equipped with displays and/or input controls, particularly as computing devices become increasingly smaller and may be embedded in other everyday objects. These types of computing devices lacking a graphical display and input controls may be referred to as "headless" devices.

One approach that has been used to enable users to provision a headless device for wireless network connectivity is to use a secondary device connected to the headless device via a direct physical connection such as, for example, a Universal Serial Bus (USB), FireWire, or other physical data connection. The secondary device may then be able to send provisioning data over the physical data connection to the headless device. However, some headless devices may not be equipped with, or do not conveniently expose, a port connector for a physical connection due to size limitations of the device, a desired form factor, and/or other aesthetical reasons related to the device's design.

DETAILED DESCRIPTION

Figure 1:
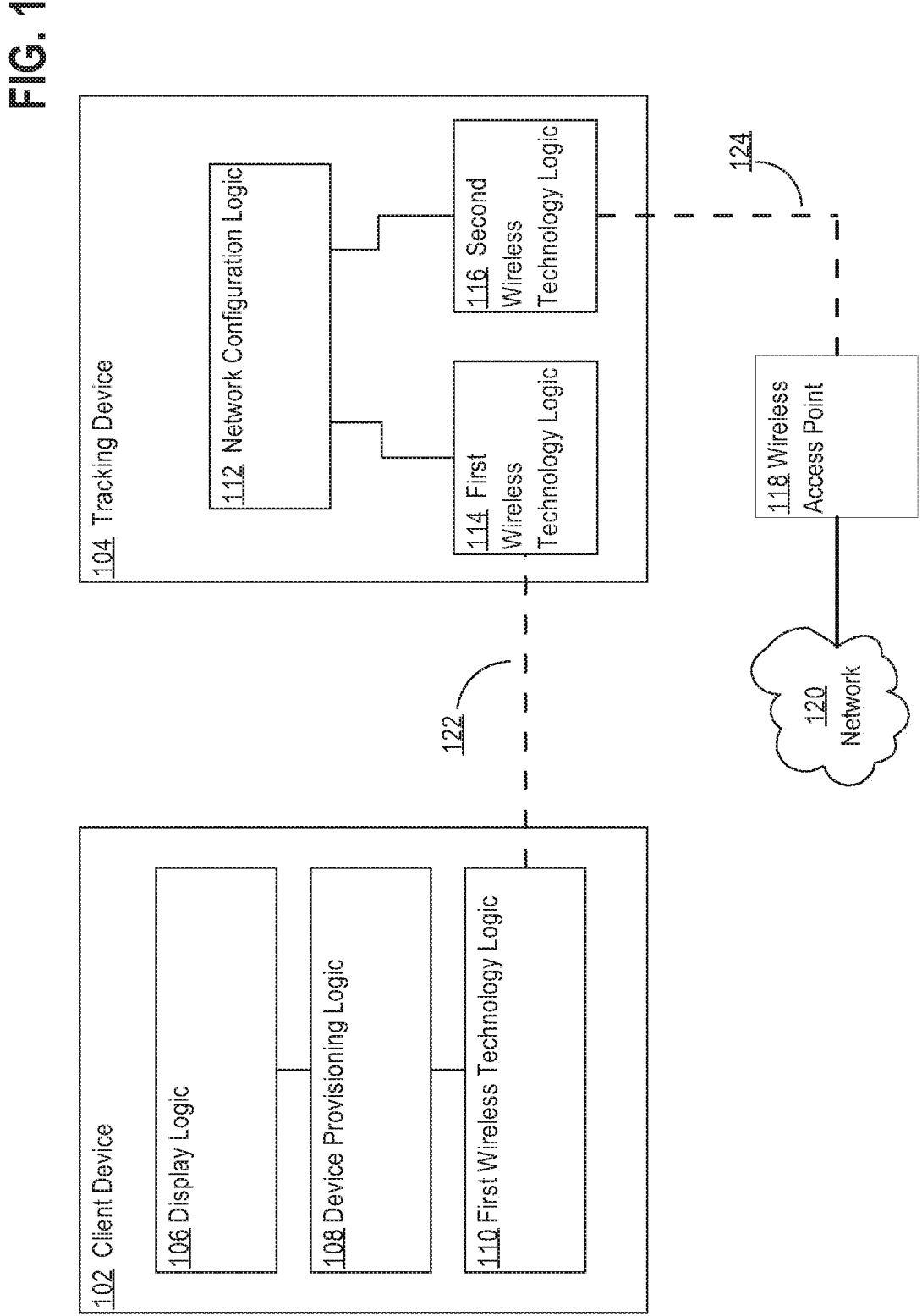
FIG. 1 illustrates a computer system in accordance with an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 General Overview

Approaches, techniques, and mechanisms are disclosed for provisioning wireless device profiles of a wireless computing device. In one embodiment, it may be desired to provision the wireless device for access to one or more particular wireless computer networks. For example, the wireless device may be used at a user's home, work, or other location at which one or more wireless networks are provided via wireless access points. In order to enable the wireless device to connect to a particular wireless network, the device may be provisioned using one or more wireless device profiles. In this context, a wireless device profile generally may comprise one or more network and device settings including network identifiers, network security types, network keys, and other configuration information that enables a computing device to connect to a particular wireless network.

In one embodiment, the wireless device may comprise a sealed housing and may not include an electronic display, input controls, and/or connectors for a wired connection. Accordingly, in an embodiment, the device may be provisioned for access to a particular wireless network by a secondary device via a wireless connection with the device. For example, the secondary device may be a smartphone, tablet, laptop, or other device capable of establishing a wireless connection with the wireless device and configured to send provisioning data to the wireless device over the wireless connection, as further described herein. In one embodiment, because the wireless device is not yet configured to communicate over the wireless network for which the device is being provisioned, the wireless connection between the wireless device and the secondary device may be of a different wireless connection type than that associated with the wireless network.

According one embodiment, a computer-implemented method comprises establishing, with a first device, a first wireless connection of a first wireless connection type; receiving, from the first device via the first wireless connection, provisioning data for establishing, with a second device, a second wireless connection of a second wireless connection type that is different than the first wireless connection type; establishing, based on the provisioning data, the second wireless connection with the second device; wherein the method is performed by one or more computing devices.

According to another embodiment, a computer-implemented method comprises sending, to a device via a first wireless connection of a first wireless connection type, a request causing the device to detect one or more wireless networks of a second wireless connection type that is different than the first wireless connection type; receiving, from the device, wireless network data comprising identifiers of one or more detected wireless networks of the second wireless connection type; sending, to the device, provisioning data for establishing a second wireless connection with a particular wireless network of the one or more detected wireless networks; wherein the method is performed by one or more computing devices.

According to yet another embodiment, a computer-implemented method comprises establishing, by a mobile computing device, a Bluetooth wireless connection with a second device; receiving, from the second device via the Bluetooth wireless connection, provisioning data for establishing, with a wireless access point, a Wi-Fi wireless connection; in response to receiving the provisioning data, establishing the Wi-Fi wireless connection with the wireless access point; wherein the method is performed by one or more computing devices.

Other embodiments include, without limitation, a non-transitory computer-readable medium that includes processor-executable instructions that enable a processing unit to implement one or more aspects of the disclosed methods as well as an apparatus configured to implement one or more aspects of the disclosed methods.

2.0 Structural & Functional Overview 2.1 System Overview

FIG. 1 illustrates a computer system in accordance with an embodiment. Although a specific system 100 is described herein, other embodiments are applicable to any system that can be used to perform the functionality described herein. In an embodiment, the system 100 includes a client device 102, a tracking device 104, a wireless access point 118, and a network 120, coupled to one another as indicated by lines in FIG. 1.

In an embodiment, client device 102 generally represents any device which may be used to wirelessly communicate with one or more other devices and to perform aspects of provisioning another wireless device, such as a tracking device 104, as further described herein. Client device 102 may comprise a smart phone, a laptop computer, a tablet computer, a personal digital assistant (PDA), a desktop computer, and other computing devices. Examples include APPLE IPHONE and IPAD devices, ANDROID devices, etc. In an embodiment, a client device 102 includes display logic 106, device provisioning logic 108, and first wireless technology logic 110, each of which may comprise one or more elements of firmware, hardware, software, or a combination thereof in various embodiments that can implement the functions described herein.

In an embodiment, display logic 106 is configured to display a graphical representation of one or more graphic constructs related to the wireless device provisioning approaches described herein. As an example, client device 102 may be a smartphone and display logic 106 may be operable to receive touch screen signals and other user input from, and display graphics constructs to, a graphical user interface provided by a display of client device 102. Touch screen signals may comprise selecting buttons, holding down buttons, selecting items displayed on the screen, dragging, or other gestures or selections. In general, display logic 106 is configured to receive user input and determine what user requests or commands are represented by the user input.

In an embodiment, device provisioning logic 108 generally is configured to generate and send wireless device profiles and other provisioning data related to a tracking device 104. For example, device provisioning logic 108 may be configured to coordinate with a tracking device 104 the detection of available wireless networks, generate wireless device profiles based on received user input and other data, and to send generated wireless device profiles to a tracking device 104 for the tracking device to use in establishing wireless connections. In one embodiment, device provisioning logic 108 may be implemented as part of an application program or app configured to execute on the iOS or Android operating system. In other embodiments, device provisioning logic 108 may be implemented as a combination of programming instructions written in any programming language (e.g., C++ or Java) and hardware components (e.g. memory, CPU time) that have been allocated for executing the program instructions on a client device 102.

In an embodiment, first wireless technology logic 110 is configured to establish one or more wireless connections, such as a wireless connection 122 between client device 102 and a tracking device 104. In one embodiment, first wireless technology logic 110 may represent logic for implementing one or more short-ranged wireless technology standards commonly used for establishing a direct connection between two or more devices that are within a general proximity of each other. In general, these types of short-range wireless connections may comprise what is referred to as a wireless personal area network. Examples of wireless personal area networking standards that may be implemented by first wireless technology logic 110 include, but are not limited to, Bluetooth, Z-Wave, ZigBee, and infrared. In an embodiment, first wireless technology logic 110 generally may be compatible with first wireless technology logic 114 of a tracking device 104.

In one embodiment, a tracking device 104 generally represents any device which may be used to wirelessly communicate with one or more other devices such as a client device 102 and a wireless access point 118. In one embodiment, tracking device 104 may be further configured to collect, store, and analyze data related to the location, movement, and other information related to the tracking device 104. In other embodiments, tracking device 104 may generally be any wireless device for which wireless connectivity with a wireless network is desired. Tracking device

104 may include logic configured to periodically send information collected by the device or other data to one or more resources via a network 120.

In an embodiment, the logic and other components of tracking device 104 may be implemented using firmware coupled to a microcontroller, one or more FPGAs, ASICs, or other combinations of firmware and digital computing hardware. In one embodiment, the components of tracking device 104 may comprise a sealed housing with one or more connectors for a wired connection such as a Universal Serial Bus (USB), FireWire, or other proprietary network or data connection. The connectors may be configured to receive power at the device (e.g., to charge an integrated battery) and to establish a data connection for device configuration purposes by a device manufacturer or other device administrator. However, in one embodiment, the connectors may not be configured for accepting a physical data or network connection from, or generally may be inaccessible to, a general user device (e.g., a smartphone or laptop). In another embodiment, the components of tracking device 104 may comprise a sealed housing without any connector for a wired connection. As one particular example, a tracking device 104 may comprise a wearable pet accessory such a pet tag, collar, or other item wearable by an animal and configured to track the location and movement of a pet wearing the accessory. The example tracking device may comprise an outer shell that resembles a typical pet tag or other accessory and that encloses the various other components and hardware of the device in a sealed housing.

In an embodiment, tracking device 104 comprises network configuration logic 112, first wireless technology logic 114, and second wireless technology logic 116. In one embodiment, network configuration logic 112 is configured to receive and store one or more wireless device profiles and other provisioning data, configure network settings for connections established by first wireless technology logic 114 and/or second wireless technology logic 116, and to perform other functions according to the approaches described herein. In general, network configuration logic 112 may be configured to receive commands and provisioning data from other devices via a wireless connection, such as from a client device 102 via a wireless connection 122, and to perform various processes related to configuring tracking device 104 for wireless connectivity in response to receiving the commands and provisioning data. In one embodiment, network configuration logic 112 may be configured to receive commands and instructions for managing device and networking settings of a tracking device. For example, a Bluetooth connection may be established between a tracking device and a client device 102 and the tracking device may receive commands and other data from the client device 102 for configuring stored Bluetooth device pairing information, network connection settings, and other device operation settings.

In one embodiment, network configuration logic 112 is configured to receive, store, and utilize one or more wireless device profiles. A wireless device profile generally may comprise one or more device and network settings that may be used by a device to establish a connection with a particular wireless network. For example, a wireless device profile for a particular wireless network may comprise a file specifying a wireless network name, wireless network security type, wireless network key, and other settings that may be used by a device when establishing a connection with the particular wireless network. In an embodiment, wireless device profiles may be exchanged between devices and used to provision a device for connectivity with a particular network, as further described herein. For example, a client device 102 may generate a wireless device profile for a wireless network associated with a wireless access point 118 and send the wireless device profile to a tracking device 104 over wireless connection 122. Network configuration logic 112 of tracking device 104 may use the received wireless device profile to establish a wireless connection 124 using second wireless technology logic 116.

In an embodiment, first wireless technology logic 114 may generally represent logic similar to first wireless technology logic 110 of a client device 102 and may be configured to establish and maintain wireless connections between tracking device 104 and one or more other devices such as a client device 102. As described above with respect to first wireless technology logic 110, in one embodiment, first wireless technology logic 114 generally may represent logic for implementing any number of short-ranged wireless technology standards such as Bluetooth, Z-Wave, ZigBee, infrared, and others.

In an embodiment, second wireless technology logic 116 represents logic for establishing wireless connections with one or more devices using a second wireless technology. In one embodiment, the particular wireless technology type implemented by second wireless technology logic 116 is different than that of first wireless technology logic 110. For example, if first wireless technology logic 114 is configured for establishing connections based on the Bluetooth wireless standard, second wireless technology logic 116 may be configured for establishing wireless connections based on a different wireless technology such as the IEEE 802.11 (Wi-Fi) wireless technology standard. Wireless connections established by second wireless technology logic 116 may be with one or more devices other than client device 102 such as, for example, a wireless access point 118. In one particular embodiment, first wireless technology logic 114 may implement the Bluetooth wireless standard, and second wireless technology logic 116 may implement the Wi-Fi wireless standard; however, the embodiments disclosed herein are not limited to Bluetooth and Wi-Fi and first wireless technology logic 114 and second wireless technology logic 116 generally may implement any two different wireless technologies.

In one embodiment, first wireless technology logic 114 may be associated with a first wireless technology logic that uses a first radio frequency band and second wireless technology logic 116 may be associated with a second wireless technology logic that uses a second radio frequency band. For example, if first wireless technology logic 114 is configured to implement the Bluetooth wireless standard, tracking device 104 may communicate in the 2400-2480 MHz radio frequency band, as defined by the Bluetooth standard. Similarly, if second wireless technology logic 116 is configured to implement the Wi-Fi wireless standard, tracking device 104 may also communicate using the 2400 MHz radio frequency band, as defined by the Wi-Fi standard. Other radio transmission-based wireless technology standards may operate in the same or other radio frequency bands depending on their implementation. However, in one embodiment, the radio frequency bands of the first wireless technology and second wireless technology may overlap, as illustrated by the example above of Bluetooth and Wi-Fi. Accordingly, in order to avoid connection interference, network configuration logic 112 may be configured to close wireless connections established by first wireless technology logic 114 in response to initiating a wireless connection using second wireless technology logic 116, and vice versa, in order to minimize interference between wireless connections established by the devices.

All components of network configuration logic 112, first wireless technology logic 114, and second wireless technology logic 116 may be integrated into a single unit of software, firmware, hardware, or a combination thereof. Thus, the separate blocks shown in FIG. 1 are provided solely to illustrate one clear example.

In an embodiment, wireless access point 118 generally represents a networked computing device configured for providing access to a network 120 and that comprises a wireless access point enabling one or more devices to wirelessly connect to the access point. In general, a wireless device may establish a connection with wireless access point 118 if the device is within a range that enables the device to send and receive wireless signals to wireless access point 118 and the device is properly configured to access the wireless network provided by the access point, as further described below. Wireless access point 118 generally may implement any wireless technology or standard that enables a device such as a tracking device 104 to establish a wireless connection with the wireless access point, and via the wireless access point to network 120.

In one embodiment, a wireless network provided by a wireless access point 118 may be associated with one or more network settings including a network security type, network access keys, and other settings. In order for a particular device to successfully connect to the wireless network, the device may first be provisioned to establish connections with the wireless access point using the appropriate network settings, for example, by using a particular network security type and a particular network key. In an embodiment, this information may be stored in a wireless device profile, as described above. In the context of a Wi-Fi-based wireless network, for example, a network security type associated with a wireless access point 118 may include the Wired Equivalent Privacy (WEP) protocol, the Wi-Fi Protected Access (WPA) or Wi-Fi Protected Access II (WPA2) protocols, or any other security type. A network key generally may be any value that enables a device to communicate with the wireless access point using the specified network security type.

Network 120 broadly represents one or more local area networks, wide area networks, global interconnected networks such as the public internet, or a combination thereof. For the purposes of illustrating a clear example, one client device 102, one tracking device 104, and one wireless access point 118 are shown, but practical implementations may include any number of separate client devices, tracking devices, and wireless access points.

2.2 Example Implementation

Figure 2:
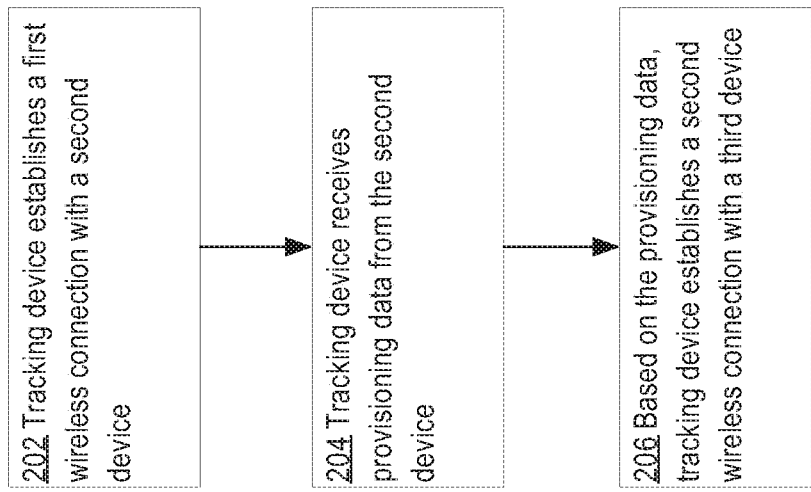
FIG. 2 illustrates a computer-implemented process for provisioning a wireless device, according to an embodiment.

FIG. 2 illustrates an example process of provisioning a wireless device, according to one embodiment. In one embodiment, a device to be provisioned may be a wireless device such as a tracking device 104 for which direct wireless connectivity to a wireless access point such as wireless access point 118 is desired. For example, wireless access point 118 may be part of a wireless router or other networking device that is located in at user's home, work, or other location, and tracking device 104 may at least occasionally be located in a physical proximity of wireless access point 118 that is near enough for a direct wireless connection between the devices. In other embodiments, the device to be provisioned generally may be any device that is wirelessly communicable and for which it is desired to provision the device for access to a particular wireless network. In an embodiment, one or more of the steps described below may be omitted, repeated, or performed in a different order. The specific arrangement or order shown in FIG. 2 is not required.

In Step 202, a tracking device establishes a first wireless connection of a first wireless connection type with a second device. For example, with reference to FIG. 1, a tracking device 104 may establish a wireless connection 122 with a client device 102. A wireless connection 122 established between a tracking device 104 and a client device 102 generally may be based on any wireless technology type that enables wireless communication between the devices, as described above. For example, wireless connection 122 may be established as a result of a Bluetooth pairing process between the first device and the second device. The establishing of a wireless connection 122 between the first device and the second device may be initiated by either device, for example, by first wireless technology logic 110 of a client device 102 or first wireless technology logic 114 of a tracking device 104.

In one embodiment, the first wireless connection may be a Bluetooth wireless connection. The Bluetooth wireless technology standard is a widely-adopted wireless standard and is commonly provided in many consumer products such as smart phones, tablets, and laptops; however, the processes described herein are not limited to Bluetooth and other wireless technology standards may be used for the first connection. Thus, as one example, Step 202 may involve establishing a Bluetooth pairing between the devices 102, 104.

In Step 204, the tracking device receives provisioning data from the second device for establishing a second wireless connection of a second wireless connection type with a third device. In an embodiment, the first device may receive the provisioning data from the second device over the first wireless connection established between the devices. For example, a tracking device 104 may receive provisioning data from a client device 102 over the wireless connection 122 established between the devices in Step 202. Thus, if devices 102, 104 have established a Bluetooth pairing, then Bluetooth communication may be used at Step 204 to communicate provisioning data for the second wireless connection type, which could be Wi-Fi or another type other than Bluetooth. In one embodiment, the provisioning data may be generated by a user of a client device 102 and sent to tracking device 104 in response to user input received at a client device 102. The processes related to a client device 102 generating and sending provisioning data to a tracking device 104 are described in further detail in reference to FIG. 3.

In an embodiment, the provisioning data may generally comprise a wireless device profile that includes information enabling the first device to establish a wireless a connection with a third wireless device. For example, the third wireless device may comprise a wireless access point, such as wireless access point 118, or any other device providing a wireless network. The wireless device profile may include one or more network and device settings that enable the tracking device to connect to the wireless network provided by the third wireless device including, for example, a wireless network name or access point name, a wireless network security type, and a wireless network key associated with the wireless network of the third wireless device; any other data associated with wireless networking may be provided, such as network addresses.

In Step 206, in response to receiving the provisioning data, the tracking device establishes a second wireless connection with a third device. In an embodiment, establishing the second wireless connection may comprise configuring one or more device networking settings based on the received provisioning data. For example, network configuration logic 112 may retrieve one or more network settings from a wireless device profile associated with the provisioning data and send the appropriate network settings to second wireless technology logic 116, or otherwise configure second wireless technology logic 116 for establishing a connection based on the network settings. As one example, the wireless device profile may specify settings for establishing a wireless connection 124 with a wireless access point 118, the wireless device profile specifying any network security type, access key, and other settings for connecting to a wireless network provided by the wireless access point. In an embodiment, network configuration logic 112 may configure second wireless technology logic 116 for establishing a second wireless connection automatically in response to receiving provisioning data or in response to other commands or input received at the tracking device or from a client device 102. Continuing with the prior example, if the devices 102, 104 had initially established Bluetooth pairing, then Step 206 could involve the tracking device 104 establishing a Wi-Fi connection as wireless connection 124 to the wireless access point 118. Step 206 also may involve closing the Bluetooth connection of devices 102, 104.

In one embodiment, the tracking device may send a message to the second device indicating whether the tracking device is able to successfully establish a connection with the third device. A message indicating that that a successful connection is established, for example, may indicate to the second device that the current provisioning of the tracking device for connections to the third device is complete.

If the tracking device is not able to establish a connection with the third device, for example, because information associated with the provided provisioning data does not match the network settings of the third device, the tracking device may send a message to the second device indicating that the connection was unsuccessful. In response to receiving a message indicating that the connection was unsuccessful, the second device may prompt a user of the second device to provide alternative provisioning data information. For example, the user may supply an alternative network access key or other network settings. Provisioning data may be generated based on the information provided by the user and sent to the tracking device for another attempt at establishing a connection to the third device.

In an embodiment, a tracking device 104 may store received provisioning data on the device so that the tracking device may use the provisioning data to establish subsequent connections in the event a current connection is closed or lost. For example, the tracking device 104 may establish a wireless connection with wireless access point 118 based on the provisioning data, send data to one or more resources accessible via network 120, and subsequently close the connection. A tracking device 104 may close the connection when the device is not accessing resources accessible via network 120, for example, in order to conserve device power or to permit new connections of a first wireless connection type from a client device 102. The tracking device 104 may establish subsequent connections with the wireless access point 118 using the stored provisioning data.

Figure 3:
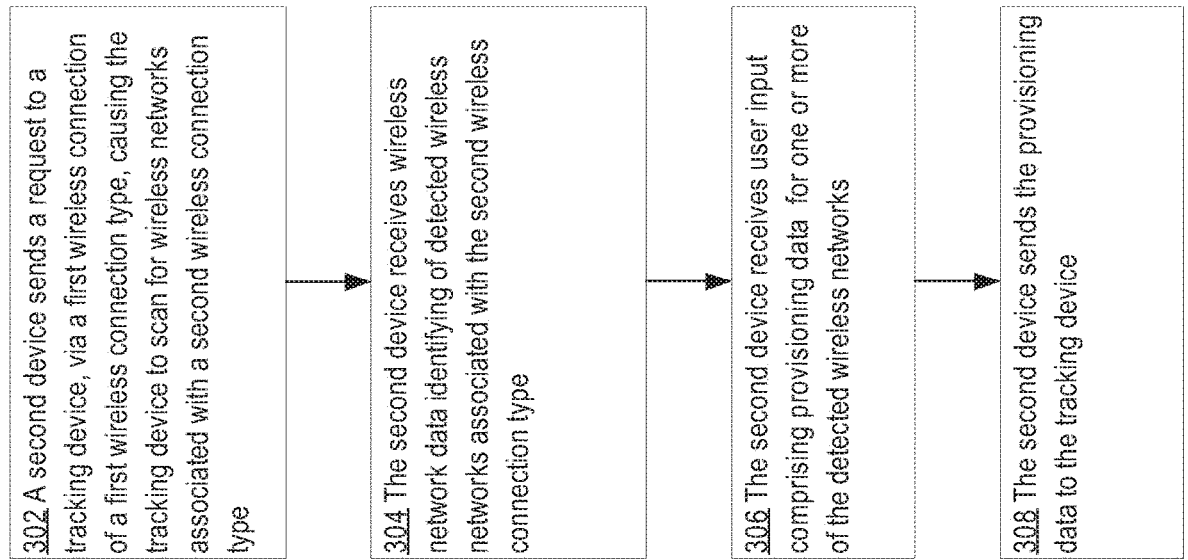
FIG. 3 illustrates a computer-implemented process for generating a wireless device profile and using the wireless device profile to provision a wireless device, according to an embodiment.

According to another embodiment, FIG. 3 illustrates a computer-implemented process for generating a wireless device profile and using the wireless device profile to provision a device. For example, a user of a client device 102 may desire to provision a tracking device 104 for access to a particular wireless device network. In an embodiment, a user may coordinate the process of generating a wireless device profile for use by a tracking device 104 by providing input at client device 102, as described below in further detail.

Referring to FIG. 3, at Step 302, a second device sends a request to a tracking device causing the tracking device to detect one or more available wireless networks. In an embodiment, the request is sent via a first wireless connection of a first wireless connection type established between the devices. For example, the first wireless connection may be established between a client device 102 and tracking device 104 by first wireless technology logic 110, 114, respectively, and generally may represent any type of wireless connection between the devices.

In an embodiment, the request may be generated by a client device 102 in response to receiving user input at the device initiating the provisioning process of a tracking device 104. The available wireless networks to be detected by a tracking device 104 may be associated with a different wireless connection type than that of the first wireless connection between client device 102 and tracking device 104. A client device 102 may be configured request a tracking device 104 to detect available wireless networks of the second wireless connection type, for example, because client device 102 is incapable of detecting wireless networks of the second wireless connection type, or is capable of detecting wireless networks but is unable programmatically to access logic of client device 102 that maintains information about available wireless networks of the second wireless connection type. For example, the wireless network information of a client device 102 may be managed by a part of an operating system or other logic running on a client device 102, but that is not accessible to device provisioning logic 108 due to security or other programmatic restrictions.

In an embodiment, a tracking device 104 may detect available wireless networks of the second wireless technology type, for example, by performing a network scan using second wireless technology logic 116. For example, if second wireless technology type represents the Wi-Fi wireless standard, available Wi-Fi wireless networks may be detected based on one or more wireless access points broadcasting detectable identifier of the wireless networks associated with the access points. For example, wireless access point 118 may be configured to broadcast an SSID identifying a wireless network associated with the device and which may be detected by tracking device 104 in a network scan. Tracking device 104 generally may detect any wireless network of the second wireless technology type that is within a detectable range of the tracking device 104, and may include wireless networks that are not associated with a user of client device 102 or tracking device 104. A tracking device 104 may be configured to send the wireless network identifiers to the requesting client device 102 in response to performing a network scan.

At Step 304, the second device receives wireless network data comprising identifiers of one or more detected wireless networks. In general, identifiers may be any value that identifies the detected wireless networks detected by a tracking device 104. In one embodiment, the identifiers may comprise one or more SSID values representing a human-readable text string or any other values that that identify particular wireless networks detected by the tracking device. In an embodiment, the received wireless network identifiers may be used to generate a display on client device 102 that lists the detected wireless networks. For example, display logic 106 may be configured to display to a user of client device 102 a list of the identifiers received from tracking device 104.

In one embodiment, a desired wireless network may be configured not to broadcast an SSID and thus may not be discoverable using a network scan by the tracking device. If a desired wireless network is not configured to broadcast an SSID, a user of the second device may provide a name of the network manually, for example, by typing in an SSID of the network using one or more graphical user interfaces of the second device.

In Step 306, the second device receives user input comprising provisioning data for one or more of the detected wireless networks. For example, a user may provide input data comprising one or more network settings including a network security type, a network security key, or any other settings associated with one or more of the detected wireless networks. The user input may be provided using one or more graphical user interfaces provided by the second device, such as one provided by display logic 106 of a client device 102. In an embodiment, the user input may be used to generate one or more wireless device profiles that may be used by another device to establish connections with particular wireless network.

In one embodiment, a user may provide input data in response to the user selecting one or more of the detected wireless network identifiers from a list displayed by client device 102. In response to selecting a particular wireless network identifier from the list, the user may be provided with various graphical user interfaces that enable the user to provide various network settings and other information for establishing a connection with the associated wireless network. A client device 102 may receive the user input data from the graphical user interfaces and use the input data to generate one or more wireless profiles, for example, by storing the data values in a particular wireless device profile format.

In one embodiment, the information for establishing a connection with a selected wireless network may be provided based on information previously stored on the client device 102. For example, a user may select a wireless network identifier from a list displayed on a client device 102 that represents a wireless network with which the client device 102 has previously established a wireless connection. For example, if a selected wireless network identifier is associated with a wireless network provided by wireless access point 118 that is located in the user's home, the user may have established connections with the wireless network previously using client device 102. In this instance, network settings for the wireless network may be retrieved from a wireless device profile or other data for the wireless network stored on client device 102, and these settings may be used to generate a wireless device profile for a tracking device 104.

In Step 308, the second device sends the provisioning data to the tracking device. For example, client device 102 may send one or more wireless device profiles generated based on the received user input to a tracking device 104. In an embodiment, in response to a client device 102 sending the provisioning data, either client device 102 or tracking device 104 may close the wireless connection between the devices so that the tracking device 104 may establish a second wireless connection based on the provisioning data without interference from the connection between client device 102 and tracking device 104.

In an embodiment, the tracking device receiving the provisioning data may establish a wireless connection with one or more of the wireless networks in response to receiving the provisioning data. For example, as described above with reference to FIG. 2, the tracking device may be configured to establish a wireless connection based on one or more network settings included the provisioning data, including configuring a network security type, network key, etc.

3.0 Example Implementation Mechanism—Hardware Overview

Figure 4:
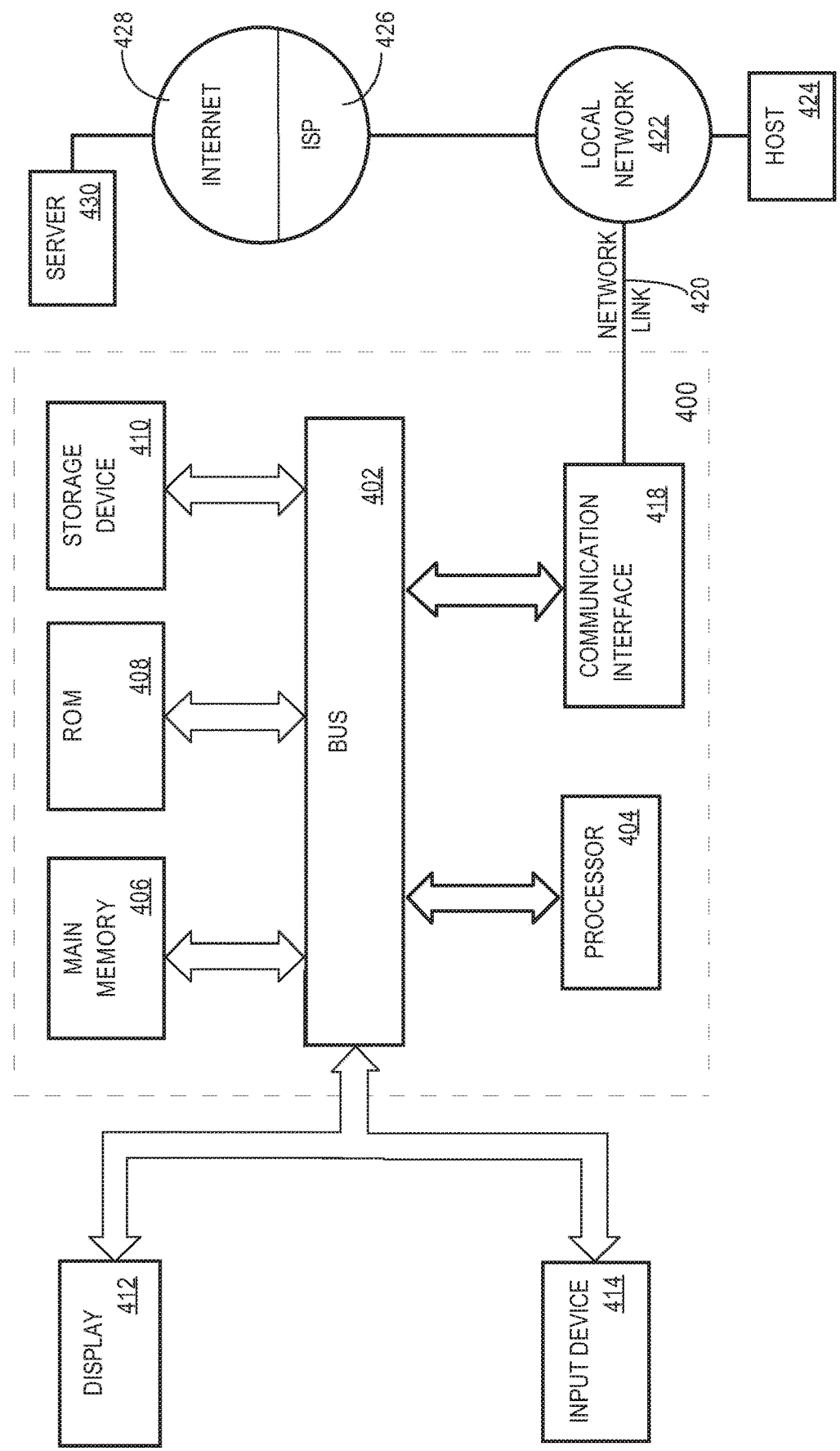
FIG. 4 illustrates an example of a computer upon which one or more embodiments may be implemented.

FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), for displaying information to a computer user. In other embodiments, a display 412 may represent LED indicator lights or other electronic displays. An input device 414, including alphanumeric and other keys, touch screen sensors, and device buttons, is coupled to bus 402 for communicating information and command selections to processor 404.

The invention is related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    sending, to a headless tracking device via a first wireless connection of a first wireless connection type, a request causing the headless tracking device to detect one or more wireless networks of a second wireless connection type that is different than the first wireless connection type,
        wherein the request comprises command data, received by the headless tracking device via the first wireless connection, for the headless tracking device to perform a network scan configured to detect one or more wireless networks of the second wireless connection type, and
        wherein the headless tracking device comprises circuitry that collects data related to location or movement of the headless tracking device;
    sending, to the headless tracking device via the first wireless connection of the first wireless connection type, provisioning data for establishing a second wireless connection with a particular wireless network of the one or more detected wireless networks,
        wherein the provisioning data comprises, for a particular wireless network of the one or more detected wireless networks, a wireless device profile comprising one or more of a wireless network name, a wireless network security type, and a wireless network key;
    closing, on the headless tracking device, the first wireless connection prior to the headless tracking device establishing the second wireless connection of the second wireless connection type; and
    in response to the headless tracking device closing the first wireless connection, establishing, on the headless tracking device, the second wireless connection of the second wireless connection type with the particular wireless network.

2. The method of claim 1, further comprising: receiving, from the headless tracking device, wireless network data comprising identifiers of one or more detected wireless networks of the second wireless connection type.

3. The method of claim 2, further comprising: generating a display of the identifiers of the one or more detected wireless networks of the second wireless connection type.

4. The method of claim 1, wherein the provisioning data comprises, for a particular wireless network of the one or more detected wireless networks, a wireless network security type and a wireless network key.

5. The method of claim 1, wherein establishing, on the headless tracking device, the second wireless connection of the second wireless type with the particular wireless network is in response to sending the provisioning data.

6. The method of claim 5, wherein the first wireless connection type is associated with a first radio frequency band and the second wireless connection type is associated with a second radio frequency band.

7. The method of claim 6, wherein the first radio frequency band overlaps with the second radio frequency band.

8. The method of claim 1, further comprising: receiving periodically from the headless tracking device, via one or more of the particular wireless networks, information collected by the tracking device.

9. The method of claim 1, wherein the headless tracking device is a wearable pet accessory.

10. A non-transitory computer-readable medium storing one or more sequences of instructions, which when executed by one or more processors, cause the one or more processors to carry out the steps of:
  sending, to a headless tracking device via a first wireless connection of a first wireless connection type, a request causing the headless tracking device to detect one or more wireless networks of a second wireless connection type that is different than the first wireless connection type,
    wherein the request comprises command data, received by the headless tracking device via the first wireless connection, for the headless tracking device to perform a network scan configured to detect one or more wireless networks of the second wireless connection type, and
    wherein the headless tracking device comprises circuitry that collects data related to location or movement of the headless tracking device;
  sending, to the headless tracking device via the first wireless connection of the first connection type, provisioning data for establishing a second wireless connection with a particular wireless network of the one or more detected wireless networks,
    wherein the provisioning data comprises, for a particular wireless network of the one or more detected wireless networks, one or more of a wireless network security type and a wireless network key;
  closing, on the headless tracking device, the first wireless connection prior to the headless tracking device establishing the second wireless connection of the second wireless connection type; and
  in response to the headless tracking device closing the first wireless connection, establishing, on the headless tracking device, the second wireless connection of the second wireless connection type with the particular wireless network.

11. The non-transitory computer-readable medium of claim 10, wherein the provisioning data comprises, for a particular wireless network of the one or more detected wireless networks, a wireless device profile comprising one or more of a wireless network name, a wireless network security type, and a wireless network key.

12. The non-transitory computer-readable medium of claim 10, wherein the one or more sequences of instructions, when executed by the one or more processors, cause the one or more processors to further carry out the step of:
  receiving, from the headless tracking device, wireless network data comprising identifiers of one or more detected wireless networks of the second wireless connection type.

13. The non-transitory computer-readable medium of claim 12, wherein the one or more sequences of instructions, when executed by the one or more processors, cause the one or more processors to further carry out the step of:
  generating a display of the identifiers of the one or more detected wireless networks of the second wireless connection type.

14. The non-transitory computer-readable medium of claim 10, wherein establishing, on the headless tracking device, the second wireless connection of the second wireless type with the particular wireless network is in response to sending the provisioning data.

15. The non-transitory computer-readable medium of claim 10, wherein the first wireless connection type is associated with a first radio frequency band and the second wireless connection type is associated with a second radio frequency band.

16. The non-transitory computer-readable medium of claim 15, wherein the first radio frequency band overlaps with the second radio frequency band.

17. The non-transitory computer-readable medium of claim 10, wherein the one or more sequences of instructions, when executed by the one or more processors, cause the one or more processors to further carry out the step of:
  receiving periodically from the tracking device, via one or more of the particular wireless networks, information collected by the headless tracking device.

18. The non-transitory computer-readable medium of claim 10, wherein the headless tracking device is a wearable pet accessory.

19. A system, comprising:
  one or more processors; and
  a non-transitory computer-readable medium storing one or more sequences of instructions, which when executed by the one or more processors, cause the one or more processors to carry out the steps of:
    sending, to a headless tracking device via a first wireless connection of a first wireless connection type, a request causing the headless tracking device to detect one or more wireless networks of a second wireless connection type that is different than the first wireless connection type,
      wherein the request comprises command data, received by the headless tracking device via the first wireless connection, for the headless tracking device to perform a network scan configured to detect one or more wireless networks of the second wireless connection type, and
      wherein the headless tracking device comprises circuitry that collects data related to location or movement of the headless tracking device;
    sending, to the headless tracking device via the first wireless connection of the first wireless connection type, provisioning data for establishing a second wireless connection with a particular wireless network of the one or more detected wireless networks,
      wherein the provisioning data comprises, for a particular wireless network of the one or more detected wireless networks, one or more of a wireless network security type and a wireless network key;
    closing, on the headless tracking device, the first wireless connection prior to the headless tracking device establishing the second wireless connection of the second wireless connection type; and
    in response to the headless tracking device closing the first wireless connection, establishing, on the headless tracking device, the second wireless connection of the second wireless connection type with the particular wireless network.

20. The system of claim 19, wherein the provisioning data comprises, for a particular wireless network of the one or more detected wireless networks, a wireless device profile comprising one or more of a wireless network name, a wireless network security type, and a wireless network key.

* * * * *